US008559851B2

(12) United States Patent
Konishi

(10) Patent No.: US 8,559,851 B2
(45) Date of Patent: Oct. 15, 2013

(54) DRIVING MECHANISM AND IMAGE FORMING APPARATUS COMPRISING THE SAME

(75) Inventor: Hidehisa Konishi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 330 days.

(21) Appl. No.: 13/116,537

(22) Filed: May 26, 2011

(65) Prior Publication Data

US 2011/0293329 A1   Dec. 1, 2011

(30) Foreign Application Priority Data

May 31, 2010   (JP) .................................. 2010-124344

(51) Int. Cl.
   *G03G 15/00* (2006.01)
(52) U.S. Cl.
   USPC ......................................... 399/167; 474/166
(58) Field of Classification Search
   USPC ........... 399/117, 167, 299; 474/148, 166, 167
   See application file for complete search history.

(56) References Cited

U.S. PATENT DOCUMENTS

| | | | | |
|---|---|---|---|---|
| 2,092,241 A | * | 9/1937 | Brasseur | 474/83 |
| 2,936,640 A | * | 5/1960 | Zahn | 474/271 |
| 3,731,550 A | * | 5/1973 | Malecki et al. | 474/83 |
| 5,417,157 A | * | 5/1995 | Kobler | 101/228 |
| 5,418,600 A | * | 5/1995 | Genovese | 399/167 |
| 5,708,933 A | * | 1/1998 | Nogami et al. | 399/167 |
| 6,125,253 A | * | 9/2000 | Tashima et al. | 399/167 |
| 2011/0038652 A1 | * | 2/2011 | Kobayashi et al. | 399/167 |

FOREIGN PATENT DOCUMENTS

| | | | |
|---|---|---|---|
| JP | 62043855 A | * | 2/1987 |
| JP | 2000250279 A | * | 9/2000 |
| JP | 2001278430 A | * | 10/2001 |
| JP | 2004084709 A | * | 3/2004 |
| JP | 2004-100854 | | 4/2004 |
| JP | 2005207555 A | * | 8/2005 |
| JP | 2006027489 A | * | 2/2006 |

* cited by examiner

*Primary Examiner* — Robert Beatty
(74) *Attorney, Agent, or Firm* — Dilworth & Barrese, LLP.

(57) ABSTRACT

A driving mechanism includes: a looped metallic transmission belt; a first shaft member; a second shaft member; and a pulley that is connected to the second shaft member so as to be rotatable about a second rotational axis, in which the first shaft member includes: a rotatably supported portion that is disposed at one end; and an extended portion that is disposed at another end so as to be continuous with the rotatably supported portion, in which a portion between the contact portion and the rotatably supported portion is flexurally deformed, the extended portion being rotatable about a diagonal rotational axis that is inclined at a predetermined angle relative to the first rotational axis, and the pulley includes a inclined outer surface that is inclined, such that a portion that is most separated from the first shaft member is substantially parallel with the extended portion.

5 Claims, 4 Drawing Sheets

DRIVING MECHANISM AND IMAGE FORMING APPARATUS COMPRISING THE SAME

This application is based on and claims the benefit of priority from Japanese Patent Application No. 2010-124344, filed on May 31, 2010, the content of which is incorporated herein by reference.

BACKGROUND OF THE INVENTION

1. Field of the Invention

The present invention relates to a driving mechanism that rotationally drives a shaft member, and to an image forming apparatus including the driving mechanism.

2. Related Art

Conventionally, there exist types of an image forming apparatus such as a printer or copying machine, which have a photosensitive drum as an image carrier. The photosensitive drum includes a photosensitive drum main body and a shaft member. The shaft member is disposed in a rotation center of the photosensitive drum main body so as to penetrate the photosensitive drum main body. The photosensitive drum is rotationally driven as a result of a rotational driving force being directly or indirectly transmitted from a rotational driving unit to the shaft member.

A known example of a driving mechanism that rotationally drives a photosensitive drum is a driving mechanism that is provided with a metallic transmission belt that is stretched over an output shaft of a motor and a shaft member of a photosensitive drum via a pulley, in a state in which the output shaft of the motor is disposed so as to be parallel with the shaft member of the photosensitive drum. Such a driving mechanism transmits a rotational driving force of the motor to the shaft member of the photosensitive drum by the metallic transmission belt.

In an image forming apparatus including a driving mechanism such as described above, one end of the output shaft of the motor is rotatably supported by a motor main body. Moreover, the transmission belt is stretched over the other end of the output shaft of the motor via the pulley. In such an image forming apparatus, the metallic transmission belt is stretched over the output shaft of the motor and the shaft member of the photosensitive drum via the pulley in a state of having a predetermined tensile force, so as not to slip with respect to the output shaft of the motor, the shaft member of the photosensitive drum, the pulley thus interposed, etc. As a result, the metallic transmission belt suppresses micro-vibration or the like caused by engagement of gears as compared with a case in which a rotational driving force is transmitted via gears. Therefore, the metallic transmission belt can stably transmit a rotational driving force from the motor to the shaft member of the photosensitive drum.

Incidentally, there are many cases in which an output shaft of a motor used for a small-sized device such as an image forming apparatus has a small diameter. Therefore, there are cases in which the output shaft of the motor may be flexurally deformed toward the shaft member side of the photosensitive drum, due to a tensile force of the metallic transmission belt that is stretched over the output shaft and the shaft member of the photosensitive drum.

SUMMARY OF THE INVENTION

Therefore, in an image forming apparatus such as described above, in a case in which the output shaft of the motor is flexurally deformed toward the shaft member side of the photosensitive drum, the metallic transmission belt may run in a serpentine way. As a result, there is a possibility that the metallic transmission belt cannot run stably. Moreover, as a result of the transmission belt running in a serpentine way, there has been a possibility that the transmission belt may deteriorate, reducing the life of the transmission belt. Therefore, a driving mechanism is desired in which a metallic transmission belt can run stably.

An object of the present invention is to provide a driving mechanism that transmits a rotational driving force by a metallic transmission belt, in which the metallic transmission belt can run stably.

In addition, another object of the present invention is to provide an image forming apparatus including the driving mechanism.

The present invention relates to a driving mechanism that includes: a looped metallic transmission belt that is disposed in a state of having a predetermined tensile force; a rotational driving unit that can output a rotational driving force; a bearing portion; a first shaft member that is rotatably supported by the bearing portion; a second shaft member, of which one end is rotatably supported so as to be rotatable about a second rotational axis; and a pulley that is in contact with an inner surface of the transmission belt, is connected to the second shaft member, and is rotatable about the second rotational axis; in which the first shaft member includes: a rotatably supported portion that is disposed at one end, is directly or indirectly connected to the rotational driving unit, and is rotatably supported by the bearing portion so as to be rotatable about the first rotational axis that is parallel with the second rotational axis; and an extended portion that is disposed at another end so as to be continuous with the rotatably supported portion, and includes a contact portion that is in contact with an inner surface of the transmission belt, in which a portion between the contact portion and the rotatably supported portion is flexurally deformed due to a tensile force applied to the contact portion by the transmission belt, the extended portion being rotatable about a diagonal rotational axis that is inclined at a predetermined angle relative to the first rotational axis, and the pulley includes an inclined outer surface that is inclined at a predetermined angle relative to the second rotational axis, such that a portion that is most separated from the first shaft member in a portion in contact with the transmission belt is substantially parallel with the extended portion.

According to the present invention, it is possible to provide a driving mechanism that transmits a rotational driving force by a metallic transmission belt, in which the metallic transmission belt can run stably.

Moreover, the present invention can provide an image forming apparatus including the driving mechanism.

DETAILED DESCRIPTION OF THE INVENTION

An embodiment of the present invention will be hereinafter described with reference to the attached drawings.

Figure 1:
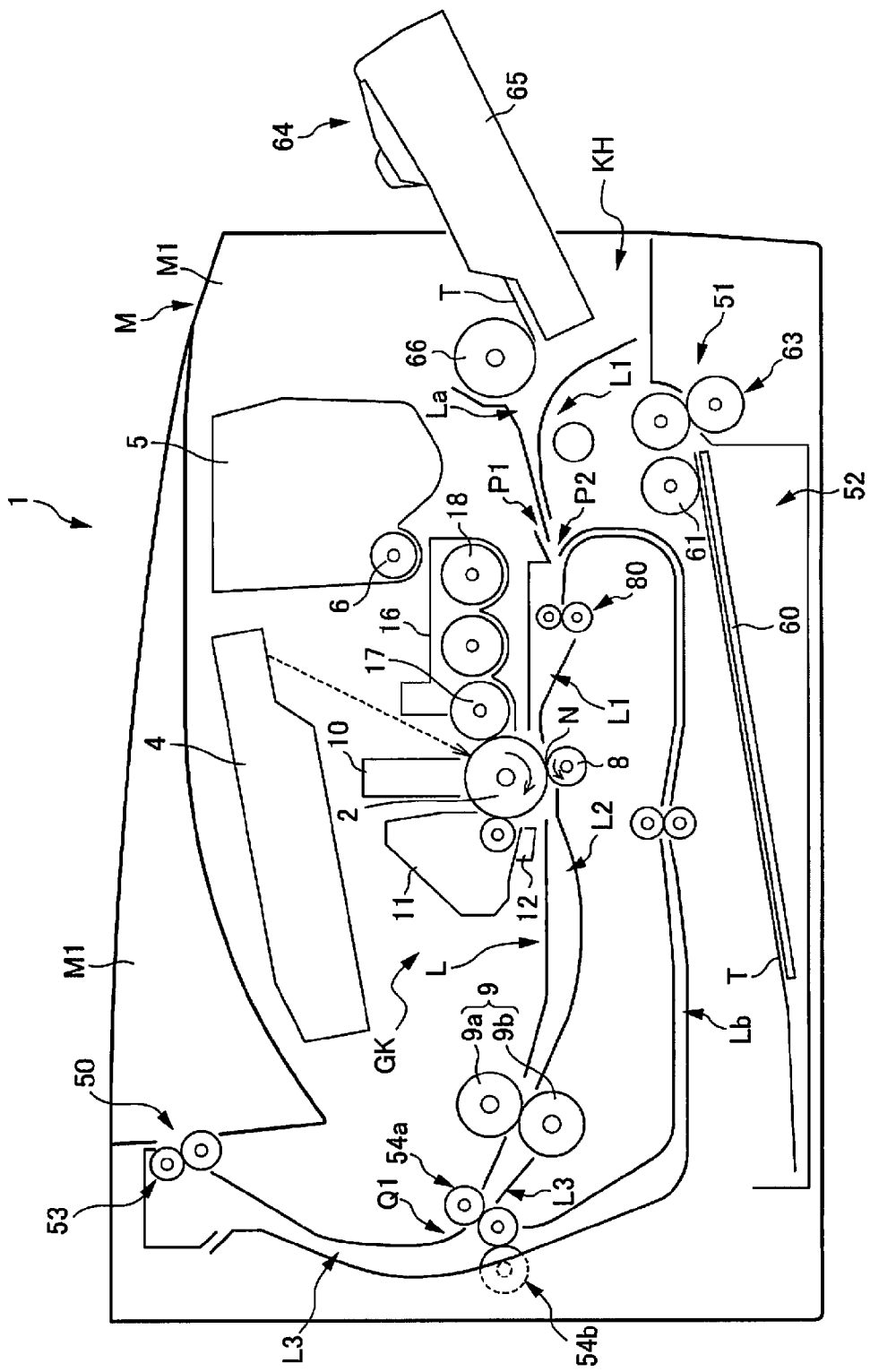
FIG. 1 is a view showing an arrangement of components of a printer 1.

With reference to FIG. 1, a description is provided for an entire structure of a printer 1 as an image forming apparatus of the present invention. FIG. 1 is a view showing an arrangement of components of the printer 1.

As shown in FIG. 1, the printer 1 as the image forming apparatus has an apparatus main unit M, an image forming unit GK, and a paper feeding/discharging portion KH. The image forming unit GK forms a predetermined toner image on a sheet of paper T as a sheet-like transfer material, based on predetermined image information. The paper feeding/discharging portion KH feeds the sheet of paper T to the image forming unit GK, and discharges the sheet of paper T on which a toner image has been formed.

The external shape of the apparatus main unit M is configured with a cabinet BD as its housing.

As shown in FIG. 1, the image forming unit GK includes a photosensitive drum 2 as an image carrier (photosensitive body), a charging unit 10, a laser scanner unit 4 as an exposure unit, a developing unit 16, a toner cartridge 5, a toner supply unit 6, a drum-cleaning unit 11, a neutralization unit 12, a transfer roller 8, and a fixing part 9.

As shown in FIG. 1, the paper feeding/discharging portion KH includes a paper feed cassette 52, a manual paper feed unit 64, a conveyance path L of a sheet of paper T, a pair of resisting rollers 80, and a paper discharging unit 50.

Configurations of the image forming unit GK and the paper feeding/discharging portion KH will be hereinafter described in detail.

First, the image forming unit GK is described. Charging by the charging unit 10, exposure by the laser scanner unit 4, development by the developing unit 16, transfer by the transfer roller 8, neutralization by the neutralization unit 12, and cleaning by the drum-cleaning unit 11 are sequentially performed in order from upstream to downstream along a surface of the photosensitive drum 2 in the image forming unit GK.

Figure 2:
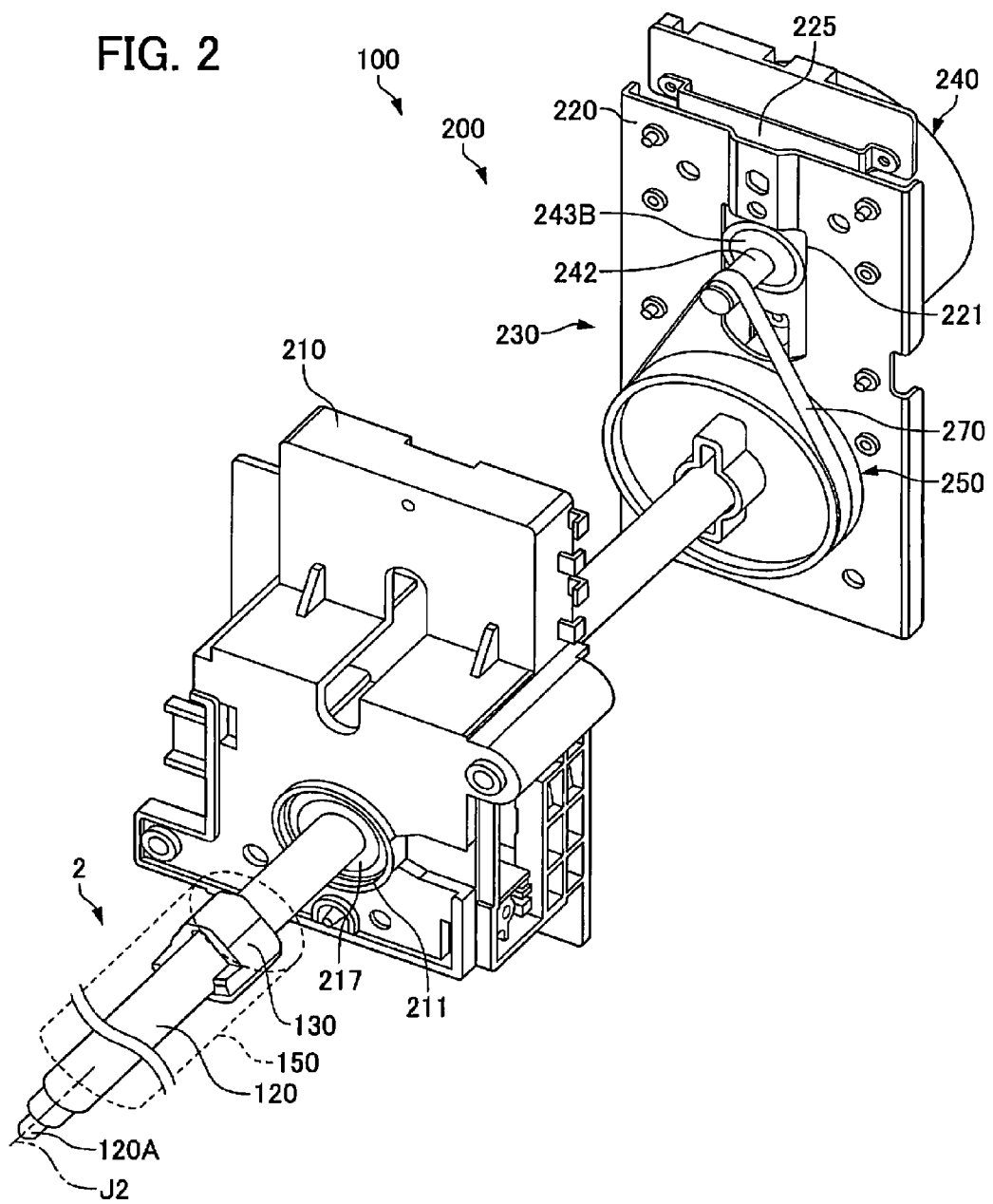
FIG. 2 is a perspective view showing a configuration of a rotational driving mechanism 230 in the printer 1 in a state in which a housing 210 is removed from a frame 220.

The photosensitive drum 2 has a cylindrical photosensitive drum main body 150 (see FIG. 2) and a drum penetrating shaft member 120 as a second shaft member (see FIG. 2). The drum penetrating shaft member 120 is disposed in a rotation center of the photosensitive drum main body 150 so as to penetrate the photosensitive drum main body 150.

One end 120A of the drum penetrating shaft member 120 is rotatably supported by a bearing that is not illustrated in the drawings. The drum penetrating shaft member 120 is fixed to the photosensitive drum main body 150 via a flange portion 130 (see FIG. 2). The flange portion 130 is positioned at an end portion in a cylindrical axis direction of the photosensitive drum main body 150. As a result, the photosensitive drum main body 150 is configured to be rotatable about a second rotational axis J2 integrally with the drum penetrating shaft member 120. The second rotational axis J2 is formed so as to extend in a direction orthogonal to a direction in which a sheet of paper T is conveyed through the conveyance path L.

The photosensitive drum main body 150 functions as a photosensitive body or an image carrier.

A photosensitive drum driving unit 200 (see FIG. 2) transmits a rotational driving force to the drum penetrating shaft member 120. As a result, the photosensitive drum 2 is disposed rotatably about the second rotational axis J2 in a direction indicated by an arrow in FIG. 1. An electrostatic latent image may be formed on a surface of the photosensitive drum 2.

Here, the photosensitive drum 2 is unitized, and is disposed integrally with the photosensitive drum unit 100 (see FIG. 2). The photosensitive drum unit 100 is composed of the photosensitive drum driving unit 200.

Details of the photosensitive drum unit 100 and the photosensitive drum driving unit 200 will be described later.

The charging unit 10 is disposed to face the surface of the photosensitive drum 2. The charging unit 10 negatively or positively charges the surface of the photosensitive drum 2 uniformly (with negative or positive polarity).

The laser scanner unit 4 functions as an exposure unit, and is disposed spaced apart from the surface of the photosensitive drum 2. The laser scanner unit 4 is composed of a laser light source, a polygon mirror, a polygon mirror driving motor and the like, none of which are illustrated in the drawings.

The laser scanner unit 4 scans and exposes the surface of the photosensitive drum 2 based on image information that is input from an external device such as a personal computer (PC). By being scanned and exposed by the laser scanner unit 4, an electric charge in an exposed portion on the surface of the photosensitive drum 2 is removed. In this way, an electrostatic latent image is formed on the surface of the photosensitive drum 2.

The developing unit 16 is provided in correspondence with the photosensitive drum 2. The developing unit 16 is disposed to face the surface of the photosensitive drum 2. The developing unit 16 causes single color toner (black toner in general) to adhere to an electrostatic latent image formed on the photosensitive drum 2, thereby forming a single color toner image on the surface of the photosensitive drum 2. The developing unit 16 is composed of a developing roller 17 disposed to face the surface of the photosensitive drum 2, an agitation roller 18 for agitating toner, and the like.

The toner cartridge 5 is provided in correspondence with the developing unit 16, and stores toner to be supplied to the developing unit 16.

The toner supply unit 6 is provided in correspondence with the toner cartridge 5 and the developing unit 16. The toner supply unit 6 supplies the toner stored in the toner cartridge 5 to the developing unit 16. The toner supply unit 6 and the developing unit 16 are connected with each other via a toner feed passage that is not illustrated in the drawings.

The transfer roller 8 transfers a toner image, which has been developed on the surface of the photosensitive drum 2, onto a sheet of paper T. A transfer bias application unit (not shown) applies a transfer bias to the transfer roller 8 for transferring the toner image formed on the photosensitive drum 2 onto the sheet of paper T. The transfer roller 8 is configured to be rotatable while abutting the photosensitive drum 2.

The sheet of paper T conveyed through the conveyance path L is interposed between the photosensitive drum 2 and the transfer roller 8. The interposed sheet of paper T is pressed against the surface of the photosensitive drum 2. A transfer nip N is formed between the photosensitive drum 2 and the transfer roller 8. In the transfer nip N, the toner image developed on the photosensitive drum 2 is transferred onto the sheet of paper T.

The neutralization unit 12 is disposed to face the surface of the photosensitive drum 2. By irradiating light on the surface of the photosensitive drum 2, the neutralization unit 12 discharges electricity (neutralizes electrical charge) on the surface of the photosensitive drum 2, onto which the transfer has been performed.

The drum cleaning unit 11 is disposed to face the surface of the photosensitive drum 2. The drum cleaning unit 11 removes toner and attached matter remaining on the surface of the photosensitive drum 2, and conveys the toner and the like thus removed to a predetermined collecting mechanism for collection thereof.

By melting and pressurizing the toner that forms the toner image transferred onto the sheet of paper T, the fixing part 9 fixes the toner on the sheet of paper T. The fixing part 9 includes a heating rotor 9a to be heated by a heater, and a pressing rotor 9b to be pressed against the heating rotor 9a. The heating rotor 9a and the pressing rotor 9b interpose, press and convey the sheet of paper T on which the toner image has been transferred. The sheet of paper T is conveyed while interposed between the heating rotor 9a and the pressing rotor 9b. Accordingly, the toner transferred onto the sheet of paper T is melted and pressed, so that it is fixed on the sheet of paper T.

Next, the paper feeding/discharging portion KH is described.

As shown in FIG. 1, a paper cassette 52 for storing sheets of paper T is disposed in a lower portion of the apparatus main unit M. The paper cassette 52 is configured to be horizontally withdrawable from a right side (right side in FIG. 1) of the apparatus main unit M. A placing board 60 for placing the sheets of paper T is disposed in the paper cassette 52. The paper cassette 52 stores the sheets of paper T stacked on the placing board 60. A sheet of paper T placed on the placing board 60 is fed to the conveyance path L by a cassette paper feed unit 51 that is disposed at an end portion on a paper-feeding side in the paper cassette 52 (an end portion on the right in FIG. 1). The cassette paper feed unit 51 includes a double-feed prevention mechanism that is composed of a forward feed roller 61 and a pair of feed rollers 63. The forward feed roller 61 is a roller for picking up the sheet of paper T from the placing board 60. The pair of feed rollers 63 is a pair of rollers for feeding the sheet of paper T to the conveyance path L on a sheet by sheet basis.

A manual paper feed unit 64 is provided on the right side (right side in FIG. 1) in the apparatus main unit M. The manual paper feed unit 64 is provided to the apparatus main unit M mainly for the purpose of supplying other sheets of paper T of sizes or types different from those of the sheets of paper T that are set in the paper cassette 52. The manual paper feed unit 64 includes a manual feed tray 65 composing a part of the front face of the apparatus main unit M when the manual feed unit 64 is closed, and a paper feed roller 66. A bottom edge of the manual feed tray 65 is attached pivotably (openable and closable) to the vicinity of the paper feed roller 66. The sheets of paper T are placed on the manual feed tray 65 when it is open. The paper feed roller 66 feeds the sheet of paper T placed on the manual feed tray 65 when it is open to a manual feed conveyance path La.

A paper discharging unit 50 is provided at an upper portion of the apparatus main unit M. The paper discharging unit 50 discharges the sheet of paper T to outside the apparatus main unit M by a pair of third rollers 53. Details of the paper discharging unit 50 will be described later.

The conveyance path L for conveying the sheet of paper T includes: a first conveyance path L1 from the cassette paper feed unit 51 to the transfer nip N; a second conveyance path L2 from the transfer nip N to the fixing part 9; a third conveyance path L3 from the fixing part 9 to the paper discharging unit 50; the manual feed conveyance path La that causes a sheet of paper supplied from the manual paper feed unit 64 to join the first conveyance path L1; and a returning conveyance path Lb. The returning conveyance path Lb is where the paper conveyed from downstream to upstream through the third conveyance path L3 is reversed and then returned to the first conveyance path L1.

Moreover, a first joining portion P1 and a second joining portion P2 are provided somewhere along the first conveyance path L1. A first branching portion Q1 is provided somewhere along the third conveyance path L3.

The first joining portion P1 is where the first manual feed conveyance path La joins the conveyance path L1. The second joining portion P2 is where the returning conveyance path Lb joins the first conveyance path L1.

The first branching portion Q1 is where the returning conveyance path Lb branches off the third conveyance path L3. The first branching portion Q1 has a pair of first rollers 54a and a pair of second rollers 54b. The same roller concurrently serves as one of the pair of first rollers 54a and one of the pair of second rollers 54b.

A sensor and the pair of resisting rollers 80 are disposed somewhere along the first conveyance path L1 (more specifically, between the second joining portion P2 and the transfer roller 8).

The sensor is a sensor for detecting a sheet of paper T. The sensor is disposed immediately before the pair of resisting rollers 80 in a direction of conveying the sheet of paper T (upstream in the conveyance direction).

The pair of resisting rollers 80 is a pair of rollers for correcting skew (diagonal paper feed) of the sheet of paper T, and for adjusting timing of feeding the sheet of paper T with respect to the formation of a toner image in the image forming unit GK. The pair of resisting rollers 80 performs the aforementioned correction and timing adjustment based on information related to detection signals sent from the sensor and conveys the sheet of paper T.

The returning conveyance path Lb is a conveyance path provided for the purpose of causing another surface (unprinted surface) opposite to a surface that has already been printed to face the photosensitive drum 2 when duplex printing is performed on the sheet of paper T.

With the returning conveyance path Lb, it is possible to reverse and return the sheet of paper T, which is conveyed from the first branching portion Q1 to the paper discharging unit 50 by the pair of first rollers 54a, to the first conveyance path L1 by the second pair of rollers 54b. In addition, it is possible to convey the sheet of paper T upstream of the pair of resisting rollers 80 disposed upstream of the transfer roller 8. In the transfer nip N, a predetermined toner image is transferred onto an unprinted surface of the sheet of paper T that has been reversed through the returning conveyance path Lb.

The paper discharging unit 50 is formed at the end portion of the third conveyance path L3. The paper discharging unit 50 is disposed at the upper portion of the apparatus main unit M. The paper discharging unit 50 is open toward the right side (right side in FIG. 1, and a side closer to the manual paper feed unit 64) of the apparatus main unit M. The paper discharging unit 50 discharges the sheet of paper T conveyed through the third conveyance path L3 to outside the apparatus main unit M by the pair of third rollers 53.

A discharged paper collecting section M1 is formed on an opening side of the paper discharging unit 50. The discharged paper collecting section M1 is formed on a top face (outer face) of the apparatus main unit M. The discharged paper collecting section M1 is where the top face of the apparatus main unit M is formed to be recessed downward. A bottom face of the discharged paper collecting section M1 configures a part of the top face of the apparatus main unit M. The sheet of paper T on which a predetermined toner image has been formed and that has been discharged from the paper discharging unit 50 is stacked and accumulated on the discharged paper collecting section M1.

It should be noted that a sensor for detecting a sheet of paper is disposed in a predetermined position of each conveyance path.

Next, operations of the printer 1 of the present embodiment will be briefly described with reference to FIG. 1.

First, a case of performing single-side printing on a sheet of paper T stored in the paper cassette 52 is described.

The sheet of paper T stored in the paper cassette 52 is fed to the first conveyance path L1 by the forward feed roller 61 and the pair of feed rollers 63. Subsequently, the sheet of paper T is conveyed through the first joining portion P1 and the first conveyance path L1 to the pair of resisting rollers 80.

The pair of resisting rollers 80 performs skew correction of the sheet of paper T and adjustment of timing with a toner image.

The sheet of paper T discharged from the pair of resisting rollers 80 is introduced between the photosensitive drum 2 and the transfer roller 8 (i.e. in the transfer nip N) through the first conveyance path L1. In addition, a toner image is transferred onto the sheet of paper T between the photosensitive drum 2 and the transfer roller 8.

Subsequently, the sheet of paper T is discharged from between the photosensitive drum 2 and the transfer roller 8, and is introduced to a fixing nip between the heating rotor 9a and the pressing rotor 9b in the fixing part 9 through the second conveyance path L2. In the fixing nip, toner TN is melted, and the toner TN is fixed on the sheet of paper T.

Subsequently, the sheet of paper T is conveyed through the third conveyance path L3 to the paper discharging unit 50 by the pair of first rollers 54a. The sheet of paper T is then discharged from the paper discharging unit 50 to the discharged paper collecting section M1 by the pair of third rollers 53.

In this way, the single-side printing of the sheet of paper T stored in the paper cassette 52 is completed.

In a case of performing single-side printing on a sheet of paper T placed on the manual feed tray 65, the sheet of paper T placed on the manual feed tray 65 is fed to the manual feed conveyance path La by the paper feed roller 66. Subsequently, the sheet of paper T is conveyed through the first joining portion P1 and the first conveyance path L1 to the pair of resisting rollers 80. Subsequent operations are similar to the aforementioned operations of the single-side printing of the sheet of paper T stored in the paper cassette 52, and thus a description thereof is omitted.

Next, operations of the printer 1 in a case of performing duplex printing will be described.

As described above, in a case of the single-side printing, the printing operations are completed when the sheet of paper T on which single-side printing has been performed is discharged from the paper discharging unit 50 to the discharged paper collecting section M1.

In contrast, in a case of performing duplex printing, the sheet of paper T on which single-side printing has been performed is reversed through the returning conveyance path Lb, and then conveyed again to the pair of resisting rollers 80. In this manner, duplex printing is performed on the sheet of paper T.

More specifically, the operations are similar to the operations of single-side printing as described above, until the sheet of paper T on which single-side printing has been performed is discharged from the paper discharging unit 50 by the pair of third rollers 53. However, in a case of duplex printing, the rotation of the pair of third rollers 53 is stopped and rotated in an opposite direction, while the sheet of paper T on which single-side printing has been performed is held by the pair of third rollers 53. When the pair of third rollers 53 is rotated in the opposite direction, the sheet of paper T held by the pair of third rollers 53 is conveyed to the opposite direction through the third conveyance path L3 (in a direction from the paper discharging unit 50 to the first branching portion Q1).

As described above, when the sheet of paper T is conveyed through the third conveyance path L3 in the opposite direction, the sheet of paper T is introduced between the pair of second rollers 54b (instead of the pair of first rollers 54a). The sheet of paper T then joins the first conveyance path L1 through the returning conveyance path Lb and the second joining portion P2. Here, the sheet of paper T has already been reversed from the single-side printing.

Furthermore, the correction or adjustment is performed on the sheet of paper T by the pair of resisting rollers 80. In addition, the sheet of paper T is introduced between the photosensitive drum 2 and the transfer roller 8 through the first conveyance path L1. As a result of the sheet of paper T passing through the returning conveyance path Lb, an unprinted surface of the sheet of paper T faces the photosensitive drum 2. In this way, a toner image is transferred onto the unprinted surface of the sheet of paper T. As a result, duplex printing is performed.

Next, the photosensitive drum unit 100 of the present invention is described with reference to FIGS. 2 to 4.

FIG. 2 is a perspective view showing a configuration of a rotational driving mechanism 230 in the printer 1 in a state where a housing 210 is removed from a frame 220. FIG. 3 is a cross-sectional view showing a main portion of the rotational driving mechanism 230. FIG. 4 is a view showing a crowning shape of an inclined outer surface 251 of a pulley 250 in the rotational driving mechanism 230.

As shown in FIG. 2, the photosensitive drum unit 100 includes the photosensitive drum 2 and the photosensitive drum driving unit 200. The photosensitive drum 2 is composed of the drum penetrating shaft member 120 as the second shaft member.

As described above, the photosensitive drum 2 is configured to be rotatable about the second rotational axis J2. The photosensitive drum 2 includes the photosensitive drum main body 150 and the drum penetrating shaft member 120. The drum penetrating shaft member 120 is formed to be elongated in the second rotational axis J2 direction. The drum penetrating shaft member 120 is disposed in the rotation center of the photosensitive drum main body 150 so as to penetrate the photosensitive drum main body 150 in the second rotational axis J2 direction.

The drum penetrating shaft member 120 is fixed to the photosensitive drum main body 150 via the flange portion 130 that is positioned at the end of the second rotational axis J2 direction of the photosensitive drum main body 150. Both ends of the drum penetrating shaft member 120 are disposed to protrude from both ends of the photosensitive drum main body 150. One end 120A of the drum penetrating shaft member 120 is rotatably supported by a bearing that is not illustrated in the drawings.

Figure 3:
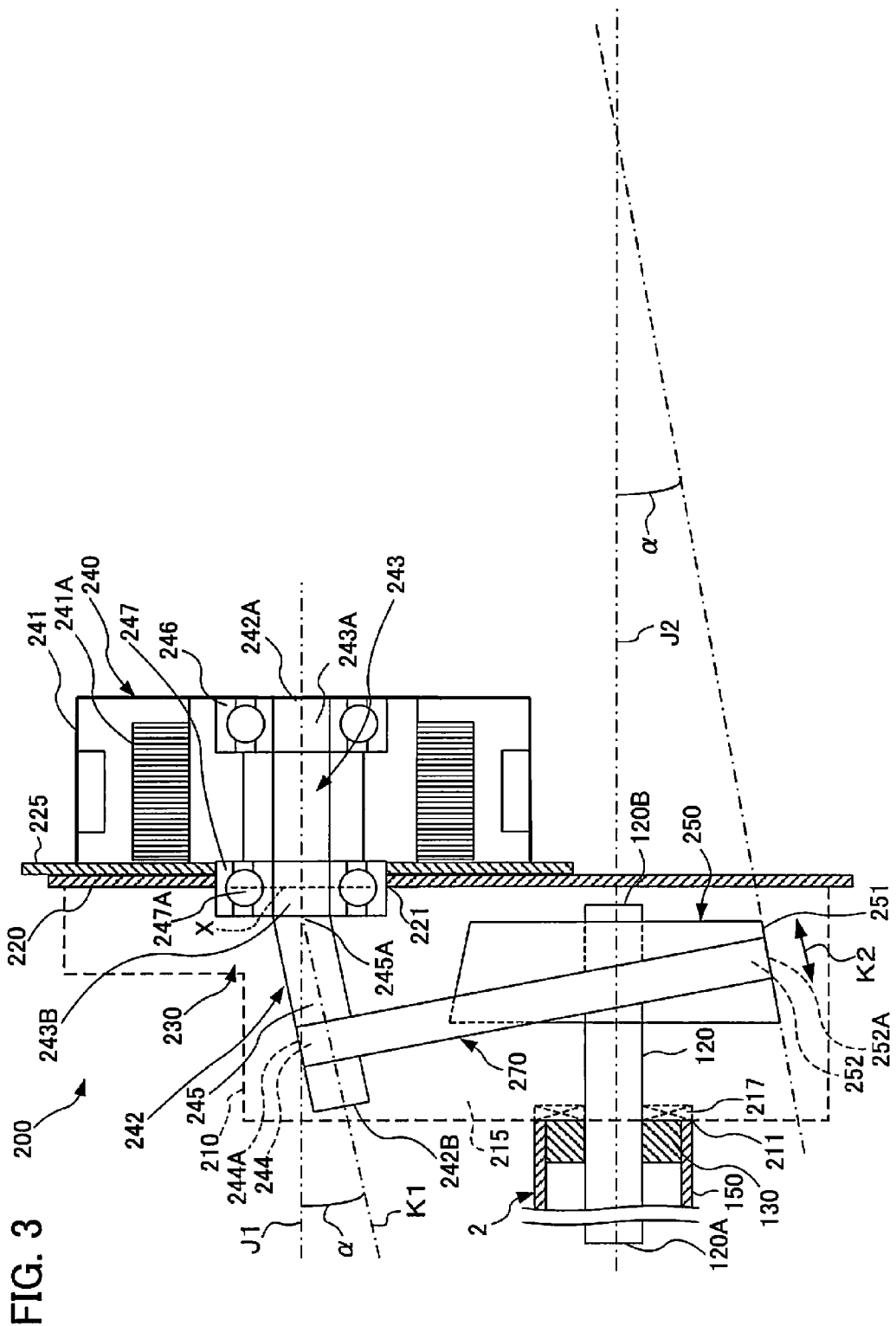
FIG. 3 is a cross-sectional view showing a main portion of the rotational driving mechanism 230.

As shown in FIGS. 2 and 3, the photosensitive drum driving unit 200 has the housing 210, the frame 220, and the rotational driving mechanism 230 as a driving mechanism. The rotational driving mechanism 230 includes a motor 240, the pulley 250, and a transmission belt 270. The pulley 250 is connected to another end 120B of the drum penetrating shaft member 120. The transmission belt 270 is stretched over a motor output shaft 242 (a first shaft member) of the motor 240 and the pulley 250.

As shown in FIG. 3, the housing 210 is a box-shaped member, one side of which is open. The frame 220 is a plate-like member. The housing 210 is fixed to the frame 220. The frame 220 is fixed to the cabinet BD and the like of the printer 1. An accommodation space 215 is formed by fixing the housing 210 to the frame 220.

A part of the rotational driving mechanism 230 is disposed in the accommodation space 215.

The housing 210 has a housing through-hole 211. The drum penetrating shaft member 120 passes through the housing through-hole 211. The other end 120B of the drum penetrating shaft member 120 is disposed in the accommodation space 215. The drum penetrating shaft member 120 is rotatably supported by a first bearing 217 that is fixed to the housing through-hole 211.

A motor main body 241 (to be described later) is attached via an attachment plate 225 on another side of the frame 220 that is opposite to the housing 210. The frame 220 has a frame through-hole 221. A motor output shaft 242 of the motor 240 (to be described later) passes through the frame through-hole 221. Another end 242B of the motor output shaft 242 is disposed to protrude to the accommodation space 215 side.

Moreover, a second bearing 247 as a bearing portion is fixed to the frame through-hole 221. The second bearing 247 rotatably supports the motor output shaft 242 of the motor 240 attached to the frame 220.

The transmission belt 270 is disposed inside the accommodation space 215. The transmission belt 270 is formed as a loop, and is rotatable in a loop direction. The transmission belt 270 has a predetermined length in the loop direction, and has a predetermined length in another direction (width direction) that is orthogonal to the loop direction. The transmission belt 270 in a state of having a predetermined tensile force is disposed to be stretched over the motor output shaft 242 and the pulley 250.

The transmission belt 270 has a predetermined tensile force such that, in a state in which the transmission belt 270 is stretched over the motor output shaft 242 and the pulley 250, the transmission belt 270 can rotate by following the motor output shaft 242 and the pulley 250 without slipping thereon. As a result, the transmission belt 270 can favorably transmit a rotational driving force, which is output from the motor output shaft 242, to the drum penetrating shaft member 120. In the present embodiment, for example, the transmission belt 270 is stretched over the motor output shaft 242 and the pulley 250 in a state of having a tensile force of about 10 kgf.

The transmission belt 270 is a metallic belt. The transmission belt 270 is formed of, for example, a material mainly composed of stainless steel. Since the transmission belt 270 is made of metal, the rotational driving mechanism 230 can obtain high rotational rigidity. As a result, the transmission belt 270 can favorably transmit a rotational driving force, which is output from the motor output shaft 242, to the drum penetrating shaft member 120.

Therefore, the transmission belt 270 can stably transmit a rotational driving force from the motor output shaft 242 of the motor 240 to the drum penetrating shaft member 120, as compared to a case such as being configured to transmit a rotational driving force to the drum penetrating shaft member 120 via a gear.

In addition, the transmission belt 270 is less likely to expand and contract as compared to a case of being configured with rubber or the like. Therefore, the transmission belt 270 can favorably transmit a rotational driving force of the motor 240 from the motor output shaft 242 to the drum penetrating shaft member 120.

As shown in FIG. 3, the motor 240 has: the motor main body 241 having a rotational driving unit 241A; the motor output shaft 242 as the first shaft member; and an in-motor bearing 246 as a bearing portion.

The motor main body 241 is attached to the frame 220 so as to be disposed opposite to the photosensitive drum 2 in relation to the frame 220. The rotational driving unit 241A of the motor main body 241 is configured to be able to output a rotational driving force to the motor output shaft 242. The motor main body 241 is configured with, for example, a brushless motor.

The in-motor bearing 246 is disposed at an end portion (rear end portion) that is opposite to a side where the motor output shaft 242 protrudes from the motor main body 241. The in-motor bearing 246 rotatably supports a base end at one end 242A of the motor output shaft 242 inside the motor main body 241.

Furthermore, as described above, outside the motor main body 241, the motor output shaft 242 is rotatably supported by the second bearing 247 as the bearing portion. The second bearing 247 is fixed to the frame through-hole 221.

In this way, the motor output shaft 242 on the end 242A is rotatably supported by the in-motor bearing 246 and the second bearing 247. The in-motor bearing 246 and the second bearing 247 are configured with, for example, a ball bearing.

The motor output shaft 242 has: an output-shaft rotatably supported portion 243 as a rotatably supported portion, and an extended portion 245. The output-shaft rotatably supported portion 243 and the extended portion 245 are continuously formed, and the motor output shaft 242 is configured as a single shaft member.

The diameter of the motor output shaft 242 is smaller than the diameter of the drum penetrating shaft member 120 of the photosensitive drum 2. For example, in the present embodiment, the diameter of the motor output shaft 242 is about 0.5 to 0.8 times the diameter of the drum penetrating shaft member 120. More specifically, for example, the diameter of the motor output shaft 242 is about 6 mm to 10 mm. The diameter of the drum penetrating shaft member 120 of the photosensitive drum 2 is about 8 mm to 12 mm.

Therefore, the motor output shaft 242 is flexurally deformed due to the transmission belt 270 that is stretched over the motor output shaft 242 and the pulley 250 in a state of having a predetermined tensile force.

The output-shaft rotatably supported portion 243 is a portion that is rotatably supported by the in-motor bearing 246 and the second bearing 247, in the motor output shaft 242.

The output-shaft rotatably supported portion 243 is disposed at one end 242A of the motor output shaft 242. The output-shaft rotatably supported portion 243 is a portion from a first rotatably supported portion 243A to a second rotatably supported portion 243B. The first rotatably supported portion 243A is a portion that is rotatably supported by the in-motor bearing 246 at a rear end portion of the motor main body 241. The second rotatably supported portion 243B is a portion that is rotatably supported by the second bearing 247. The second bearing 247 is fixed to the frame through-hole 221 of the frame 220 to which the motor main body 241 is attached.

The output-shaft rotatably supported portion 243 is directly or indirectly connected to the rotational driving unit 241A. The output-shaft rotatably supported portion 243 is rotated about a first rotational axis J1 due to a rotational driving force that is output from the rotational driving unit 241A.

The extended portion 245 is disposed on the other end 242B of the motor output shaft 242 so as to be continuous with the output-shaft rotatably supported portion 243.

The extended portion 245 has a contact portion 244 at the other end 242B of the motor output shaft 242. The contact portion 244 is in contact with the inner surface of the transmission belt 270 that is in a state having a predetermined tensile force.

The transmission belt 270 is stretched over the contact portion 244. Therefore, a tensile force is applied to the contact portion 244 due to the tensile force of the transmission belt 270. As a result, the extended portion 245 is flexurally deformed so as to bend a bent portion 245A that is a portion between the contact portion 244 and the output-shaft rotatably supported portion 243. Here, the bent portion 245A in the extended portion 245 is a portion in a boundary, or a portion in a vicinity of the boundary, between the output-shaft rotatably supported portion 243 and the extended portion 245.

As a result of flexural deformation due to the tensile force applied to the contact portion 244 by the transmission belt 270, the extended portion 245 is inclined at a first angle a as a predetermined angle relative to the first rotational axis J1. As a result of the output-shaft rotatably supported portion 243 rotating about the first rotational axis J1, the extended portion 245 is configured to be rotatable about a diagonal rotational axis K1. The diagonal angle K1 is an angle that is inclined at the first angle α relative to the first rotational axis J1. Due to the tensile force applied to the contact portion 244, the extended portion 245 is rotated in a state of being inclined at the first angle α relative to the first rotational axis J1.

It should be noted that the first angle α, at which the extended portion 245 is inclined, includes an angle of the extended portion 245 being inclined due to looseness between the in-motor bearing 246 and the motor output shaft 242, and looseness between the second bearing 247 and the motor output shaft 242. In other words, the first angle a is an angle of the extended portion 245 being inclined relative to the first rotational axis J1 as a result of the flexural deformation of the extended portion 245 due to the tensile force of the transmission belt 270. The extended portion 245 is flexurally deformed due to the tensile force applied to the contact portion 244 by the transmission belt 270.

Here, a description is provided for the boundary between the output-shaft rotatably supported portion 243 and the extended portion 245. As described above, in the present embodiment, the output-shaft rotatably supported portion 243 is a portion from the first rotatably supported portion 243A to the second rotatably supported portion 243B, in the motor output shaft 242. Moreover, the extended portion 245 is a portion from the second rotatably supported portion 243B to the other end 242B.

More specifically, the second rotatably supported portion 243B is rotatably supported by the second bearing 247. The second bearing 247 is configured with ball bearings. Therefore, the second rotatably supported portion 243B is rotatably supported by the second bearing 247 in portions intersecting a plane X that passes through the center of a plurality of balls 247A that are accommodated inside the second bearing 247.

Therefore, more precisely, the boundary between the output-shaft rotatably supported portion 243 and the extended portion 245 is a portion where the plane X intersects the motor output shaft 242. In other words, the one end 242A of the motor output shaft 242 in relation to the plane X is the output-shaft rotatably supported portion 243. In addition, the other end 242B of the motor output shaft 242 in relation to the plane X is the extended portion 245.

As shown in FIG. 3, at the other end 120B of the drum penetrating shaft member 120, the pulley 250 is connected and fixed to the drum penetrating shaft member 120 so as to cover the outer surface of the drum penetrating shaft member 120. The pulley 250 is configured to be rotatable about the second rotational axis J2 integrally with the drum penetrating shaft member 120.

The pulley 250 is disposed adjacently to the extended portion 245 of the motor output shaft 242 in a direction orthogonal to the first rotational axis J1 direction and the second rotational axis J2 direction. The pulley 250 is shaped like a cone with the tip being cut off. The pulley 250 is formed in a substantially trapezoid shape in its cross section that is viewed from a direction orthogonal to the second rotational axis J2 direction.

The pulley 250 has the inclined outer surface 251. The inclined outer surface 251 has a contact inclined portion 252 in contact with the inner surface of the transmission belt 270. The transmission belt 270 is stretched over the contact inclined portion 252. The contact inclined portion 252 is in contact with the inner surface of the transmission belt 270 in a state of having a predetermined tensile force.

The inclined outer surface 251 of the pulley 250 is inclined at the first angle a relative to the second rotational axis J2, such that a pulley side intersection portion 252A is substantially parallel with the extended portion 245 of the motor 240. In the contact inclined portion 252, the pulley side intersection portion 252A is a portion that is most separated from the motor output shaft 242. The pulley side intersection portion 252A is a portion where the plane including the first rotational axis J1 and the second rotational axis J2 intersects the contact inclined portion 252 of the pulley 250.

Moreover, the pulley side intersection portion 252A is disposed to be substantially parallel with a motor shaft side intersection portion 244A. The motor shaft side intersection portion 244A is a portion where the plane including the first rotational axis J1 and the second rotational axis J2 intersects the contact portion 244.

In other words, in the present embodiment, the inclined outer surface 251 is inclined at the first angle a relative to the second rotational axis J2, such that the inclined outer surface 251 is closer to the second rotational axis J2 in going from the one end 120A toward the other end 120B of the drum penetrating shaft member 120 in the second rotational axis J2 direction.

An inclined direction of the inclined outer surface 251 being inclined at the first angle a relative to the second rotational axis J2 is referred to as an "inclined direction K2". An inclination of the inclined outer surface 251 is formed along the inclined direction K2 over the entire area in the circumferential direction.

The first angle α, which is an inclination angle of the inclined outer surface 251, is set by obtaining experimental results and the like, of the first angle a of the extended portion 245 inclined by a tensile force of the transmission belt 270. Factors for inclining the extended portion 245 at the first angle a include the diameter of the motor output shaft 242, the diameter of the drum penetrating shaft member 120, the length of the transmission belt 270 in the loop direction, the tensile force of the transmission belt 270, the looseness of the in-motor bearing 246, the looseness of the second bearing 247 and the like.

Figure 4:
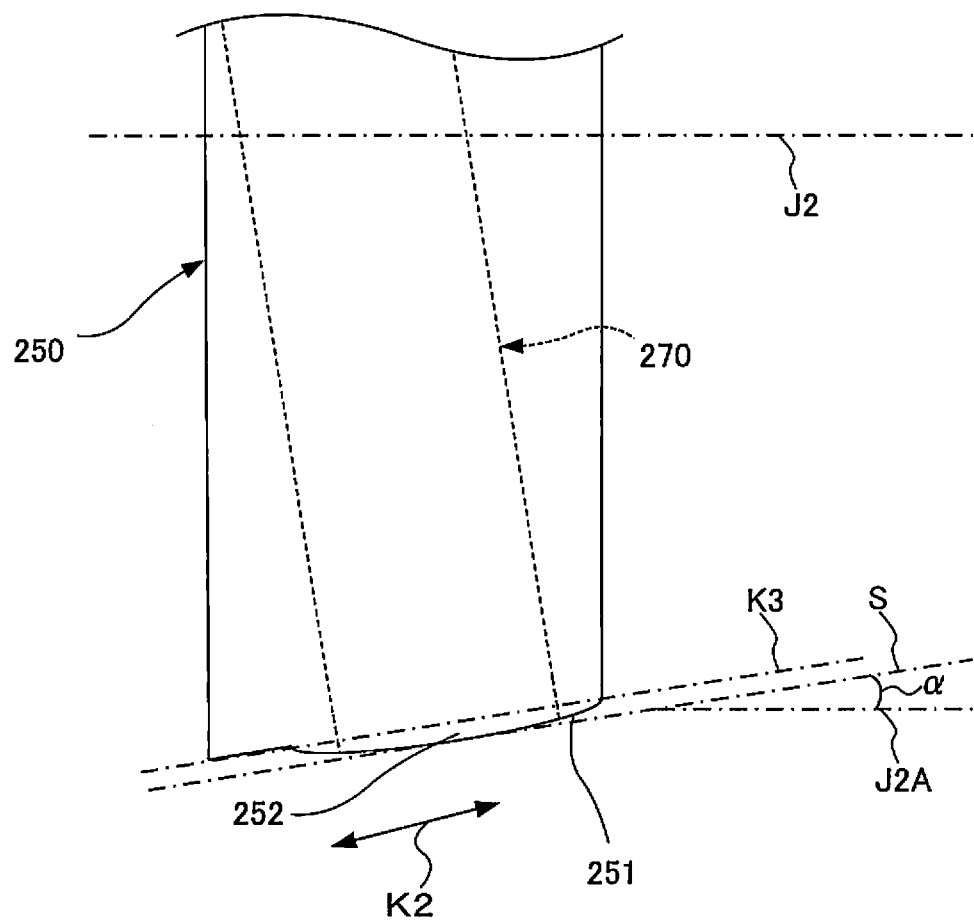
FIG. 4 is a view showing a crowning shape of an inclined outer surface 251 of a pulley 250 in the rotational driving mechanism 230.

As shown in FIG. 4, the inclined outer surface 251 is formed in a crowning shape. A central portion in the inclined direction K2 of the contact inclined portion 252 protrudes as the crowning shape of the inclined outer. surface 251. The transmission belt 270 is in contact with the contact inclined portion 252. The crowning shape of the contact inclined portion 252 preferably has an extent and shape of protrusion such that the transmission belt 270 can run stably while being in contact with the contact inclined portion 252.

More specifically, the crowning shape of the contact inclined portion 252 is formed by expansion and protrusion of the central portion in the inclined direction K2 of the contact inclined portion 252. The crowning shape of the contact inclined portion 252 is preferably formed such that the extent of protrusion gradually decreases towards edges of the contact inclined portion 252 in the inclined direction K2.

In addition, the crowning shape of the contact inclined portion 252 is preferably formed such that both edges in the inclined direction K2 of the contact inclined portion 252 have the same shape with respect to the central area (both edges have a symmetrical shape with respect to the center in the inclined direction K2). As a result of forming the crowning shape in this way, each of both edges of the crowning shape is equally in contact with the transmission belt 270 with respect to the center of the contact inclined portion 252.

As a result of forming the inclined outer surface 251 in the crowning shape, slipping of the transmission belt 270, which is stretched over the pulley 250 and the motor output shaft 242, on the inclined outer surface 251 in the inclined direction K2 is suppressed. As a result, the transmission belt 270 can run stably. Therefore, the rotational driving force of the motor 240 is favorably transmitted from the motor output shaft 242 via the transmission belt 270 to the pulley 250. Furthermore, running of the transmission belt 270 in a serpentine way is suppressed. As a result, damage to the transmission belt 270 is curbed.

Here, in a case such as the present embodiment in which the crowning shape is formed on the contact inclined portion 252 of the inclined outer surface 251, the first angle a is an angle of a tangential line S of the crowning shape relative to the second rotational axis J2. The tangential line S of the crowning shape is a tangential line on the protruding portion in the center of the inclined direction K2 of the contact inclined portion 252. More specifically, as shown in FIG. 4, in a case in which the crowning shape is formed, the first angle $\alpha$ is an angle of the tangential line S relative to a parallel line J2A when assuming the parallel line J2A that is parallel with the second rotational axis J2. It should be noted that, in the present embodiment, a direction in which the tangential line S extends is substantially parallel with the inclined direction K2 of the contact inclined portion 252.

In other words, in a case in which the inclined outer surface 251 is formed to be inclined at the first angle $\alpha$ relative to the second rotational axis J2, the crowning shape that is formed on the contact inclined portion 252 is preferably formed with reference to a reference line K3 extending in parallel with the inclined direction K2 in the contact inclined portion 252.

In other words, with reference to the reference line K3, each of both edges of the crowning shape with respect to the central portion in the inclined direction K2 of the contact inclined portion 252 is formed in the same shape. As a result, the crowning shape of the contact inclined portion 252 is formed in a shape that is uniformly in contact with the transmission belt 270. Therefore, the contact inclined portion 252 having the crowning shape is in contact with the inner surface of the transmission belt 270 in a preferable state.

It should be noted that, in a case in which a plurality of asperities are formed on the inclined outer surface 251, the first angle $\alpha$ can be an angle of a straight line connecting substantially average heights of the plurality of asperities relative to the second rotational axis J2.

In the printer 1 having the rotational driving mechanism 230 as described above, when the printer 1 is operated, a rotational driving force from the motor main body 241 shown in FIG. 3 is output to the motor output shaft 242.

The output-shaft rotatably supported portion 243 at the end 242A of the motor output shaft 242 is rotatably supported by the in-motor bearing 246 and the second bearing 247. The extended portion 245 at the other end 242B of the motor output shaft 242 is configured with a free end.

The transmission belt 270 in a state of having a predetermined tensile force is stretched over the motor output shaft 242 and the pulley 250. Moreover, the transmission belt 270 is made of metal that is mainly composed of stainless steel. In addition, the diameter of the motor output shaft 242 is smaller than the diameter of the drum penetrating shaft member 120.

Therefore, the extended portion 245 of the motor output shaft 242 is flexurally deformed toward the pulley 250 side due to the tensile force of the transmission belt 270. More specifically, in the extended portion 245 of the motor output shaft 242, the bent portion 245A (a portion between the contact portion 244 and the output-shaft rotatably supported portion 243) is flexurally deformed due to the tensile force applied to the contact portion 244 by the transmission belt 270. As a result, the extended portion 245 of the motor output shaft 242 is inclined at the first angle a relative to the first rotational axis J1.

The motor output shaft 242 is rotated by the rotational driving force from the motor main body 241. The output-shaft rotatably supported portion 243 at the one end 242A of the motor output shaft 242 is rotated about the first rotational axis J1. Moreover, the extended portion 245 at the other end 242B of the motor output shaft 242 is rotated about the diagonal rotational axis K1.

The rotational driving force that is output from the motor output shaft 242 is transmitted to the pulley 250 via the transmission belt 270. The transmission belt 270 is stretched over the motor output shaft 242 and the pulley 250.

Here, the inclined outer surface 251 of the pulley 250 is inclined at the first angle a relative to the second rotational axis J2, such that the pulley side intersection portion 252A is substantially parallel with the extended portion 245. The pulley side intersection portion 252A is a portion that is most separated from the motor output shaft 242 in the contact portion 244 that is in contact with the transmission belt 270.

Therefore, the pulley side intersection portion 252A is substantially parallel with the motor shaft side intersection portion 244A. The pulley side intersection portion 252A is a portion where the plane including the first rotational axis J1 and the second rotational axis J2 intersects the contact inclined portion 252 of the pulley 250. The motor shaft side intersection portion 244A is a portion where the plane including the first rotational axis J1 and the second rotational axis J2 intersects the contact portion 244 of the motor output shaft 242.

Therefore, the transmission belt 270 is stretched over the motor output shaft 242 and the pulley 250, in a state of favorably being in contact with the contact portion 244 of the extended portion 245 and the contact inclined portion 252 of the pulley 250. As a result, the transmission belt 270 can run stably. In addition, damage to the transmission belt 270 can be curbed. As a result, reduction in the life of the transmission belt 270 can be curbed.

Furthermore, the inclined outer surface 251 of the pulley 250 is formed in the crowning shape, in which the central portion of the contact inclined portion 252 protrudes. The contact inclined portion 252 is in contact with the transmission belt 270 in the inclined direction K2.

The crowning shape of the inclined outer surface 251 is formed by way of the central portion side that protrudes with reference to the reference line K3 that is parallel with the inclined direction K2 of the contact inclined portion 252.

Therefore, in the inclined direction K2, the transmission belt 270 is in contact with the contact inclined portion 252 of the inclined outer surface 251 in a preferable state. As a result, the transmission belt 270 can run stably.

According to the present embodiment, for example, the following effects are achieved.

The present embodiment provides: the looped metallic transmission belt 270 disposed in a state of having a predetermined tensile force; the rotation drive section 241A that can output a rotational driving force; the in-motor bearing 246 and the second bearing 247; the motor output shaft 242 that is rotatably supported by the in-motor bearing 246 and the second bearing 247; the drum penetrating shaft member 120, in which the one end 120A is supported so as to be rotatable about the second parallel rotational axis J2; and the pulley 250 that is in contact with the inner surface of the transmission belt 270, is connected to the drum penetrating shaft member 120, and is rotatable about the second rotational axis J2, in which the motor output shaft 242 includes: the output-shaft rotatably supported portion 243 that is disposed at the one end 242A, is directly or indirectly connected to the rotational driving unit 241A, and is rotatably supported by the in-motor bearing 246 and the second bearing 247 so as to be rotatable about the first rotational axis J1 that is parallel with the second rotational axis J2; and the extended portion 245 that is disposed at the other end 242B so as to be continuous with the output-shaft rotatably supported portion 243, and has the contact portion 244 that is in contact with the inner surface of the transmission belt 270, in which the bent portion 245A is flexurally deformed due to the tensile force applied by the transmission belt 270 to the contact portion 244, and the extended portion 245 is rotatable about the diagonal rotational axis K1 that is inclined at the first angle a relative to the first rotational axis J1, and the pulley 250 has the inclined outer surface 251 that is inclined at the first angle a relative to the second rotational axis J2, such that the portion 252A, which is most separated from the motor output shaft 242 in the portion in contact with the transmission belt 270, is substantially parallel with the extended portion 245.

Therefore, the pulley side intersection portion 252A of the pulley 250, which is in contact with the transmission belt 270, is substantially parallel with the motor shaft side intersection portion 244A of the extended portion 245, which is in contact with the transmission belt 270. As a result, the transmission belt 270 is stretched over the motor output shaft 242 and the pulley 250, in a state of favorably being in contact with the contact portion 244 of the motor output shaft 242 and the contact inclined portion 252 of the pulley 250. As a result, the transmission belt 270 can run stably.

Moreover, since the transmission belt 270 runs stably, falling off from the motor output shaft 242 and the pulley 250 is suppressed. In addition, since damage to the transmission belt 270 is curbed, reduction of the life of the transmission belt 270 can be curbed.

Furthermore, in the present embodiment, in the inclined direction K2 in which the inclined outer surface 251 is inclined, the inclined outer surface 251 is formed with the crowning shape, in which the central portion of the contact inclined portion 252 protrudes. Therefore, the crowning shape of the contact inclined portion 252 is formed with reference to the reference line K3 that is parallel with the inclined direction K2 of the inclined outer surface 251. As a result, since the crowning shape is formed appropriately at the contact inclined portion 252, the transmission belt 270 is in contact with the contact inclined portion 252 of the inclined outer surface 251 in an appropriate state. As a result, the transmission belt 270 can run stably.

Moreover, in the present embodiment, the diameter of the motor output shaft 242 is smaller than the diameter of the drum penetrating shaft member 120. Therefore, the motor output shaft 242 is flexurally deformed due to the tensile force of the transmission belt 270. As a result, in conjunction with the rotation of the motor output shaft 242, the extended portion 245 is inclined at the first angle a relative to the first rotational axis J1. Therefore, even during the rotation of the motor output shaft 242, the extended portion 245 of the motor output shaft 242 is inclined at the first angle α. Therefore, the motor shaft side intersection portion 244A is substantially parallel with the pulley side intersection portion 252A. As a result, the transmission belt 270 is in contact with the motor output shaft 242 and the inclined outer surface 251 in a stable state. As a result, the transmission belt 270 can run stably.

In addition, in the present embodiment, the transmission belt 270 is formed with a material mainly composed of stainless steel. Therefore, the rotational driving mechanism 230 has high rotational rigidity. As a result, the rotational driving mechanism 230 can favorably transmit a rotational driving force of the rotational driving unit 241A to the drum penetrating shaft member 120 by using the transmission belt 270. Furthermore, the transmission belt 270 is unlikely to be affected by expansion and contraction. Therefore, the transmission belt 270 can favorably transmit a rotational driving force of the rotational driving unit 241A to the drum penetrating shaft member 120.

A preferred embodiment has been described above, but the present invention is not limited to the aforementioned embodiment, and can be carried out in various modes.

For example, although the second shaft member is configured with the drum penetrating shaft member 120 of the photosensitive drum 2 in the above embodiment, it is not limited thereto. The second shaft member may be another shaft member different from the drum penetrating shaft member of the photosensitive drum 2.

Moreover, although the drum penetrating shaft member 120 is configured with a single shaft member in the above embodiment, it is not limited thereto, and it may be configured by connecting two or more shaft members via coupling.

Furthermore, the type of image forming apparatus of the present embodiment is not particularly limited, and may include a copying machine, a printer, a facsimile, a multi-function device thereof, or the like.

The sheet-like transfer material is not limited to a sheet of paper T, and may be a film sheet.

What is claimed is:

1. A driving mechanism, comprising:
   a looped metallic transmission belt that is disposed in a state of having a predetermined tensile force;
   a rotational driving unit that can output a rotational driving force;
   a bearing portion;
   a first shaft member that is rotatably supported by the bearing portion about a first rotational axis;
   a second shaft member, of which one end is rotatably supported so as to be rotatable about a second rotational axis; and
   a pulley that is in contact with an inner surface of the transmission belt, is connected to the second shaft member, and is rotatable about the second rotational axis; wherein
   the first shaft member comprises:
   a rotatably supported portion that is disposed at one end, is directly or indirectly connected to the rotational driving unit, and is rotatably supported by the bearing portion so as to be rotatable about the first rotational axis that is parallel with the second rotational axis; and an extended portion that is disposed at another end so as to be continuous with the rotatably supported portion, and includes a contact portion that is in contact with an inner surface of the transmission belt, in which a portion between the contact portion and the rotatably supported portion is flexurally deformed due to a tensile force applied to the contact portion by the transmission belt, the extended portion being rotatable about a diagonal rotational axis that is inclined at a predetermined angle relative to the first rotational axis, and wherein the pulley comprises an inclined outer surface that is inclined at a predetermined angle relative to the second rotational axis, such that a portion that is most separated from the first shaft member in a portion in contact with the transmission belt is substantially parallel with the extended portion.

2. The driving mechanism according to claim 1, wherein the inclined outer surface is formed in a crowning shape in an inclined direction in which the inclined outer surface is inclined, such that a central portion of a portion in contact with the transmission belt protrudes.

3. The driving mechanism according to claim 1, wherein a diameter of the first shaft member is smaller than a diameter of the second shaft member.

4. The driving mechanism according to claim 1, wherein the transmission belt is formed of a material mainly composed of stainless steel.

5. An image forming apparatus, comprising:
a single or plural image carriers being directly or indirectly connected to one end of the second shaft member, wherein an electrostatic latent image is formed on a surface thereof; and
the driving mechanism according to claim 1, which causes the single or plural image carriers to be rotated.

* * * * *